Feb. 7, 1950     E. A. STALKER     2,496,565
TAILLESS AIRCRAFT WITH STABILIZING WING
Filed Nov. 26, 1945
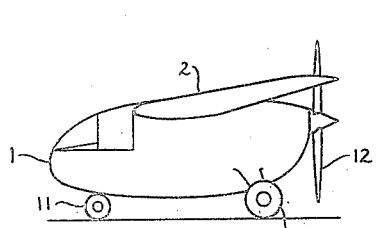
FIG. 2
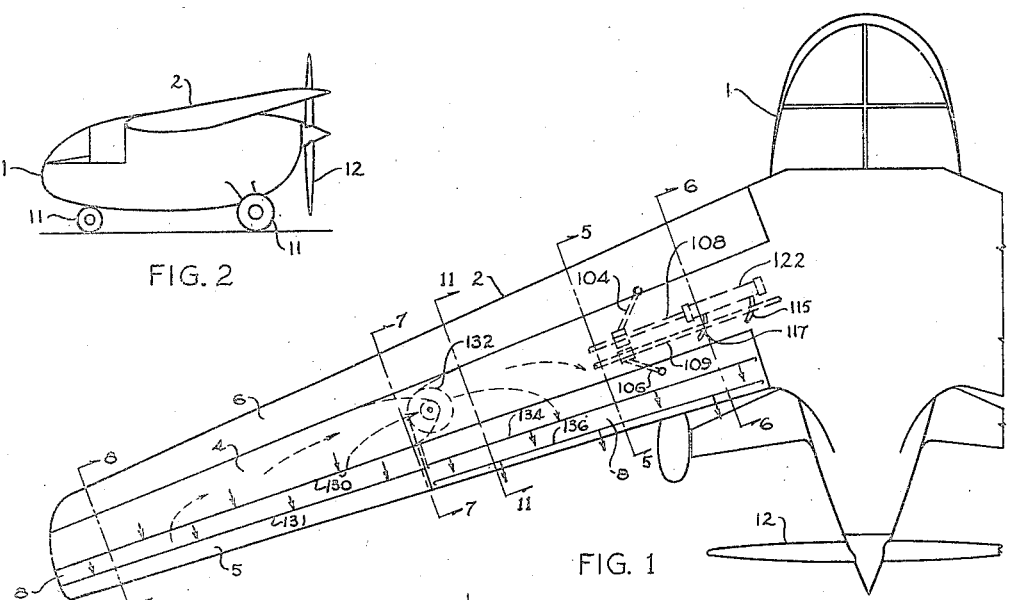
FIG. 1
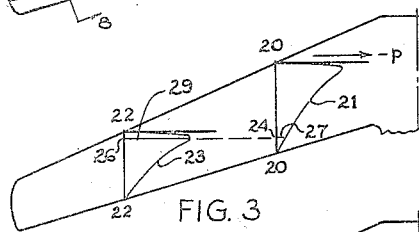
FIG. 3
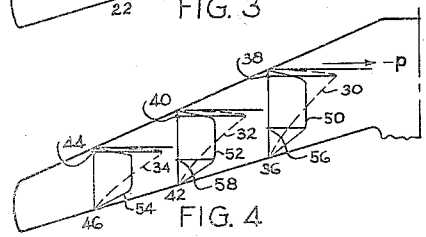
FIG. 4
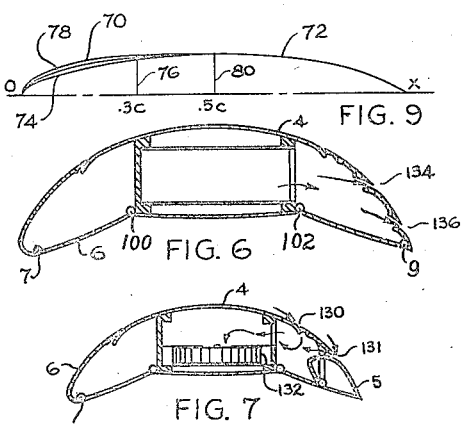
FIG. 9
FIG. 6
FIG. 7
FIG. 8
FIG. 11
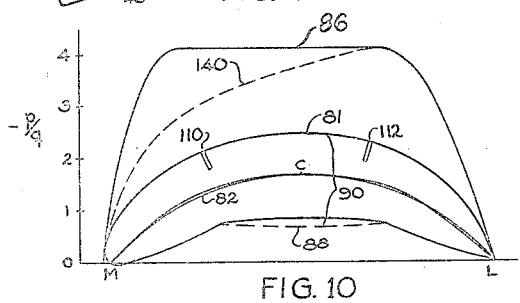
FIG. 10
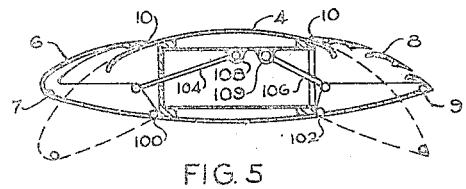
FIG. 5
INVENTOR.
Edward A. Stalker
BY
Marechal & Biebel
ATTORNEYS Patented Feb. 7, 1950

2,496,565

UNITED STATES PATENT OFFICE 2,496,565

TAILLESS AIRCRAFT WITH STABILIZING WING

Edward A. Stalker, Bay City, Mich.

Application November 26, 1945, Serial No. 630,749

5 Claims. (Cl. 244—42)

This invention relates to aircraft, particularly of the tailless variety.

The principal object of the invention is to provide an aircraft such as a flying wing or tailless type, which is so constructed that the tendency of the wing tip sections to stall before the root sections is materially reduced or avoided resulting in greatly improved performance.

Another object is to provide for maintaining a predetermined type of desirable chordwise pressure distribution over changing flight conditions.

Another object is to provide correlation between the stability of the aircraft and the pressure distribution, preferably operating automatically in response to the pressure distribution on the wing.

Still another object is to provide means of stabilizing and damping the motions of the aircraft in conjunction with the control of the boundary layer.

Other objects and advantages will appear from the following description, the accompanying drawings, and the appended claims.

In the drawings,

Fig. 1 is a fragmentary top plan view of an aircraft constructed in accordance with the present invention;

Fig. 2 is a side elevation of the aircraft;

Fig. 3 is a diagrammatic plan view of a wing to show one type of pressure distribution;

Fig. 4 is another diagrammatic plan view of a wing to show another pressure distribution;

Fig. 5 is a vertical section of the wing along the line 5—5 in Fig. 1;

Fig. 6 is a section along the line 6—6 in Fig. 1 with flaps down;

Fig. 7 is a section along the line 7—7 in Fig. 1 with flaps down;

Fig. 8 is a section along the line 8—8 in Fig. 1 with flaps up;

Fig. 9 is a diagram illustrating the shape of one-half the basic airfoil section;

Fig. 10 shows a preferred cambered airfoil section and its pressure distribution curve; and Fig. 11 is a section along the line 11—11 in Fig. 1.

In Figs. 1 and 2 are shown a tailless airplane with a large amount of sweep back. The fuselage is 1 and the wing is 2 composed of the wing main body 4, aileron 5 and the flaps 6 and 8. The flaps 6 and 8 are composed of upper and lower surfaces connected by hinges 7 and 9 respectively to permit the upper surfaces to keep contact with the upper surface of the main body 4. These flaps extend the full span of the wing while the aileron 5 is at the outer portion of the wing and extends inwardly only a little beyond the locality where section 7—7 is taken. The forward ends of the upper surfaces of the flaps are supported by inverted T-lugs 10 sliding in slots in the upper surface of the main body. The machine has the landing gear 11 and the propeller 12.

Fig. 3 shows the pressure distribution curves 21 and 23 on the upper surface at two chord locations 20 and 22 of a wing with conventional airfoil sections. Because of the displacement of the chord 22 rearward from chord 20 there is a pressure gradient of suction between such points as 24 and 26 so that the boundary layer is sucked spanwise. That is, the ordinate $-p$ of suction at 26 is greater than that at 24 as indicated by the ordinates 27 and 29.

In Fig. 4 three pressure distribution curves like those of Fig. 3 are compared with a special type of curve obtained from a different airfoil section. The conventional curves are shown in dash lines at 30, 32 and 34. It will be clear because of the relations of the suction peaks of the pressure curves that the boundary layer air will be sucked successively from portions aft of point 38 of chord 36 possibly as far forward as point 40 of chord 42 and even on toward point 44 of chord 46. Thus the layer is removed from the inboard portions of the wing and is accumulated at the outboard or tip portions. Thus the wing tends to stall first at the tips which causes a loss of control, both lateral and longitudinal since the trailing edge flap 5 serves both purposes in a tailless airplane.

If the wing has a special airfoil section the pressure distribution curves are as shown in solid lines at 50, 52 and 54. These curves are characterized by a substantially constant suction over the major portion of the chord or by a somewhat increasing suction toward a point situated as far rearward as the midpoint of the chord, preferably as far as the 0.6 point of the chord measured aft of the nose.

With this type of pressure distribution it will be noted that air at points aft of 56 on chord 36 will not be able to flow further forward than point 56 on chord 42 because there is no increase of suction ahead of this point. Hence the spanwise flow is confined to the aft portion of the wing and over a substantial area of the wing the chordwise pressure distributions over spanwise adjacent portions of the inboard portions of the wing between the flaps are such that there is an unfavorable tipward spanwise pressure gradient. This means that the tendency to collect a large amount of boundary layer at the tip portions of the wings and on the flap has been overcome and there is at most a very much reduced tendency toward this effect. This in turn means that a boundary layer control system for eliminating the boundary layer may be greatly reduced in size and power expenditure.

The wing in accordance with this invention is constructed as shown in Figs. 5 to 8 so that it can have, at all lift coefficients, the type of pressure distribution curves 50, 52 and 54 shown in Fig.

4. The airfoil section is modified by lowering the nose and tail flaps as a higher lift coefficient is desired. The section with the flaps lowered approximates the section characteristics shown in Figs. 5, 7 and 10.

The airfoil section is derived from a basic airfoil section formed over a straight line as a mean line. Thus in Fig. 9 the proper contour for the upper half of the nose curve lies between the curves 70 and 74 which fair into the rear curve 72.

The curve 70 is an elliptic quadrant formed over the major semi-axis equal to 0.3 C measured aft from the nose and the minor semi-axis 76 equal to the half the maximum thickness of the airfoil section. The chord length OX is c.

The mean curve 78 is also an elliptic quadrant laid out with the ordinate 80, equal to ordinate 76, located substantially aft of the 0.4 chord point, preferably between the midpoint and the 0.6 point of the chord.

The lower curve 74 is found by laying it off as much below 78 as 70 is above, making all measurements along ordinate lines perpendicular to the mean line OX. All the nose curves are faired into the rear contour line 72. The contour for the airfoil section is then the curve 72 plus its extension along one of a family of curves lying within the family whose outer curves are 70 and 74. It will be observed that, when the outer curve 70 is defined together with the mean curve 78, the lower curve is also immediately defined.

The thickness distribution along the wing chord as defined by the basic section of Fig. 9 is to be distributed along a curved mean camber line as indicated in Fig. 10. The stations in per cent of the chord OX in Fig. 9 are to be laid off along the mean camber line MCL in percentages of its length. Then at each station the semi-thickness at the corresponding per cent station in Fig. 9 is to be laid off perpendicular to the mean camber line and on each side thereof giving the section 81 shown by solid lines in Fig. 10. The forward portion of the mean camber line MCL preferably lies above the circle 82 drawn through the midpoint C of the mean camber line and the end points M and L. Along the rear half of the mean camber line, it may in part lie below the circular arc.

This airfoil section 81 has the pressure distribution curve 86 over the upper surface (Fig. 10). The ordinates of this curve are the suction—divided by the dynamic pressure of the relative wind V, namely, $$\frac{\rho}{2}V^2$$

is the mass density.

In order to give the airfoil section a convex lower contour when the flaps are up the lower contour in Fig. 10 is modified as indicated by the dotted line 88 giving the new section 90. The section shown in Fig. 5 closely approximates, for various flap positions, the sections obtained for various cambers according to the method illustrated in Figs. 9 and 10.

The flaps 6 and 8 are adjusted about the hinges 100 and 102, Fig. 5, by the links 104 and 106 respectively distributed along the wing span. The links 104 for operating the nose flap are pivotally connected at one end to their respective flap 6 and at the other end to the push rod 108. In plan view the links make an acute angle with the push rod so that as the rod is pushed spanwise the flaps are depressed.

In a similar manner links 106 for operating the trailing edge flap are pivotally connected to the flap 8 and the push rod 109. The rear flaps are manually operated alike on opposite sides of the center line of the airplane.

The aileron 5 is rotatable about hinge 103 by pilot operated controls.

The nose flap attitude is preferably adjusted automatically to preserve a pressure distribution over the chord similar to that shown in Fig. 10. To do this two points 110 and 112 in the upper contour are provided with pressure openings leading into tubes 114 and 116 (as shown in Fig. 11) which connect respectively to the Sylphon bellows 118 and 119. A difference in suction pressure between points 110 and 112 will cause a movement of the Sylphon which controls the balanced valve 120. The latter controls the flow of fluid pressure through the tubes 115 and 117 to power jack 122, Fig. 1, connected to the push rod 108. Pressure reaches the valve via tube 121 from a suitable source. It will be clear that as the suction at 110 tends to increase the nose flap will be automatically lowered.

It is to be noted that the bellows incorporate the characteristics of springs so that by changing this characteristic of either one the jack 122 can be made responsive to different degrees of suction pressure difference at points 110 and 112.

The airplane is directed into a climb, for instance, by lowering the flaps 8 equally on opposite sides of the aircraft. This will increase the lift and cause the aircraft to climb. In this process the suction at the nose will tend to increase beyond that at the midpoint of the chord. This difference will activate the hydraulic jack 122 to lower the nose flap and tend to bring the pressure difference back to zero or to a preassigned value for the pressure difference between points 110 and 112. For instance, if the design is executed to have an increasing suction from nose to about the midpoint, the Sylphons and valves can be adjusted to always restore or maintain this or any predetermined difference so that a predetermined pattern of pressure distribution over the wing will be maintained.

In addition to the use of the flaps and special wing section to restrain the tipward travel and accumulation of the boundary layer, slots 130 and 131 are employed. These are located in the tip portion of the wing and lead into the wing interior to the inlet of the blower 132. The inducted air is discharged through the inboard slots 134 and 136 having communication with the discharge blower. Preferably the slots are chiefly concentrated in the tip portions of the wing and the amount of slot area should be larger for the tip or outboard portions than at the inboard portions of the wing in relation to the corresponding chord lengths, expressed as a fraction of the wing area extensive along the slots. The inlet of the blower 132 is in communication only with the tip portion of the wing outwardly beyond the ends of slots 134 and 136 as indicated in Fig. 1 but not illustrated in detail since these would be understood by persons skilled in airplane construction. The boundary layer is thus inducted at the most rearward portions of the wing and this air is discharged through slots 134 and 136 in the inboard portions of the wing.

Although a description of the preferred way to achieve a proper pressure distribution over the chord of the wing has been given, it is to be understood that the invention is not intended to be limited to a constant pressure distribution or one which progressively increases from the nose to such a point as the mid-chord or some point far back on the chord. These are the preferred forms but considerable departure can be used, as for instance, a curve which has some depression over the middle portion of the chord.

Where a considerable amount of longitudinal stabilization of the aircraft is to be sought, it is preferred to make the pressure distribution increase toward the trailing edge as shown by curve 140. The pressure bellows 118 and 119 are adjusted so that in normal high speed flight the pressure distribution curve is like 86 and as the airplane pitches upward the pressure curve approaches the shape of 140, displacing the air force vector rearward and causing the pitching to be stopped. Thus the airplane is returned to balance. The adjustment is readily accomplished to make the curves 86 and 140 available. It may be done by adjusting the angular rates at which the nose and tail flaps are depressed.

For stability, especially with flaps down, it is desirable to have an increasing force acting downward on the wing so as to give an upward pitching moment to the wing. The force at the slots 130 and 131 arising from the change in momentum of the inducted boundary layer gives the desired force and moment. If the inducted air were discharged downward at the same locality it would give an opposite force and moment since these forces would have about the same momentum to the center of gravity of the machine. By locating the discharge inboard on a swept-back wing the force and moment from the discharged jet will be less since it is nearer the center of gravity and thus a net force and moment of the character desired is made available.

A swept-back wing is defined for use in this application as one whose line passing through the quarter points of the chords is not perpendicular to the longitudinal axis but inclined rearward at the tip end. The points along the chord are measured from the leading edge.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. In an aircraft, a wing, a wing main body, a nose flap and a tail flap adjustably supported respectively at the front and rear of said body to form said wing, means responsive to the pressure difference at two spaced points on the wing upper surface, and means controlled by said responsive means to adjust said flaps in coordination in response to changes in said pressure difference to maintain a predetermined pressure distribution on the wing surface.

2. In combination, a wing main body, a nose flap, a tail flap, means adjustably supporting said flaps on said body respectively along the front and rear thereof to form a wing, said wing having a basic airfoil section whose maximum thickness lies between stations at 40 per cent and 60 per cent of the chord length from the leading edge and whose upper contour ahead of the maximum thickness ordinate lies in major part within boundary curves whose mean curve is an elliptic quadrant passing through the nose point of the section and the end point of the said maximum thickness ordinate serving as the minor semi-axis of said quadrant, the outer curve of said boundary curves being an auxiliary elliptic quadrant passing through said nose point and the end of an auxiliary minor semi-axis at the 0.3 point of the chord and extending on to the outer end of said maximum thickness ordinate, said auxiliary minor semi-axis being equal to one-half the maximum thickness of said airfoil section, means responsive to the pressure on said wing at a plurality of spaced points, and means controlled by said responsive means to adjust said flaps to provide a predetermined type of pressure distribution over the surface of said wing.

3. In combination, in an aircraft, a wing having a substantial amount of sweepback tending to cause an accumulation of the boundary layer air toward its tips, said wing having an adjustable flap along the leading edge and an adjustable flap along the trailing edge thereof, means to adjust said trailing edge flap to cause the pitching of the aircraft, means responsive to the pressure difference at two spaced points along the wing upper surface, and means controlled by said responsive means to adjust said leading edge flap in coordination with said trailing edge flap in response to changes in said pressure difference to maintain a predetermined pressure distribution on the wing surface.

4. In combination, in an aircraft, a wing having a substantial amount of sweepback tending to cause an accumulation of the boundary layer air toward its tips, said wing having an adjustable flap along the leading edge and an adjustable flap along the trailing edge thereof, means to adjust said trailing edge flap to cause the pitching of the aircraft, means responsive to the pressure difference at two spaced points along the wing upper surface, means controlled by said responsive means to adjust said leading edge flap in coordination with said trailing edge flap in response to changes in said pressure difference to maintain a predetermined pressure distribution on the wing surface, means defining a slot in the upper surface of said wing, and means to induce a flow through said slot to control the boundary layer on said upper surface.

5. In an aircraft, a swing, a wing main body, a nose flap and a tail flap adjustably supported respectively at the front and rear of said body to form said wing, means responsive to the pressure difference at two spaced points on the wing upper surface, means controlled by said responsive means to adjust said flaps in coordination in response to changes in said pressure difference to maintain a predetermined pressure distribution on the wing surface, and means for adjusting the angular rates to which said nose and tail flaps are operated.

EDWARD A. STALKER.

REFERENCES CITED

The following references are of record in the file of this patent:

UNITED STATES PATENTS

| Number | Name | Date |
|---|---|---|
| 1,351,538 | Reynolds | Aug. 31, 1920 |
| 1,856,219 | Lange | May 3, 1932 |
| 2,270,920 | Backhaus | Jan. 27, 1942 |
| 2,372,301 | Stalker | Mar. 27, 1945 |
| 2,406,920 | Stalker | Sept. 3, 1946 |
| 2,416,958 | Sears | Mar. 4, 1947 |
| 2,423,803 | Stalker | July 8, 1947 |

FOREIGN PATENTS

| Number | Country | Date |
|---|---|---|
| 705,155 | France | Mar. 3, 1931 |